Dec. 15, 1931.    C. F. HANSON    1,836,532
STOCK WATERING BOWL
Filed March 29, 1930
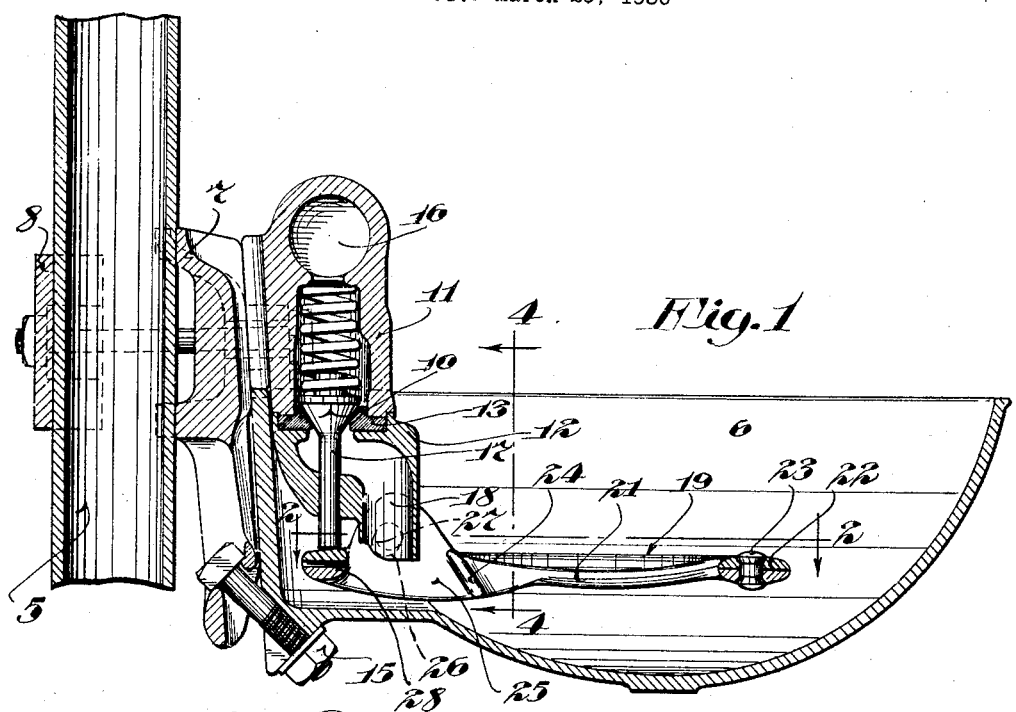
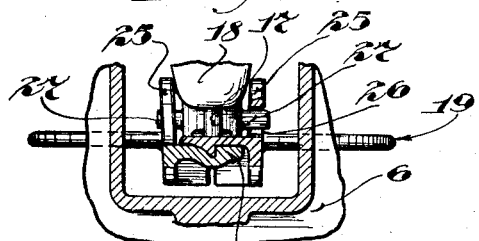
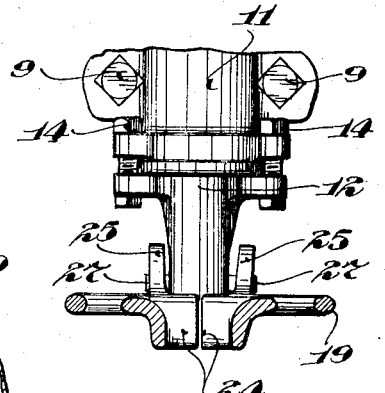
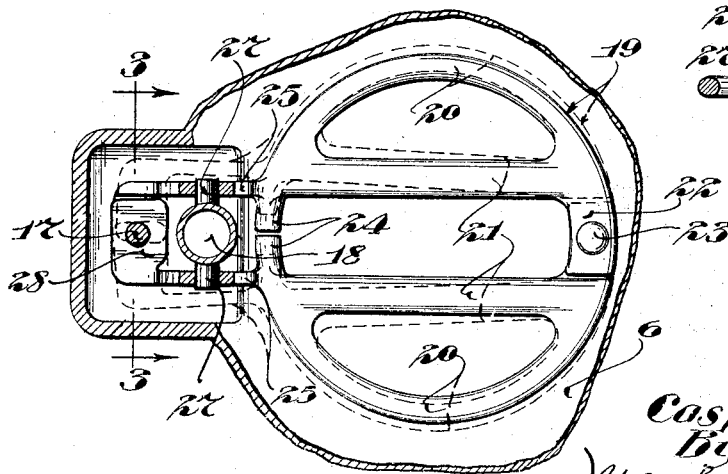
Inventor
Casper F. Hanson
By his Attorneys
Merchant and Regan Patented Dec. 15, 1931

1,836,532

UNITED STATES PATENT OFFICE

CASPER F. HANSON, OF ALBERT LEA, MINNESOTA, ASSIGNOR TO OLSON MANUFACTURING COMPANY, OF ALBERT LEA, MINNESOTA, A CORPORATION OF MINNESOTA

STOCK WATERING BOWL

Application filed March 29, 1930. Serial No. 439,963.

My present invention relates to a stock watering bowl and has for its object the provision of a novel valve actuating paddle that is removably mounted in the bowl to facilitate the cleaning thereof or to render the valve of said bowl inoperative by the removal of the paddle to prevent an animal in the stall equipped with the bowl from getting water in case of sickness or for any other reason.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a view of a stock watering bowl in longitudinal central vertical section having the invention embodied therein;

Fig. 2 is a fragmentary view partly in plan and partly in section taken on the line 2—2 of Fig. 1;

Fig. 3 is a fragmentary detail view principally in section taken on the line 3—3 of Fig. 2; and Fig. 4 is a fragmentary detail view partly in front elevation and partly in transverse vertical section taken on the line 4—4 of Fig. 1.

The numeral 5 indicates one of the tubular uprights of a barn stall structure on which the stock watering bowl is mounted.

To this upright 5 the watering bowl 6 is detachably and adjustably secured by a two-part clamp comprising front and back members 7 and 8, respectively. These clamp members 7 and 8 are applied to the upright 5 on opposite sides thereof, connected by nut-equipped bolts 9 and adjustably and frictionally clamped thereon.

A spring closed valve 10 is mounted in a two-part casing comprising upper and lower members 11 and 12, respectively, having a valve seat 13 therebetween, and connected by nut-equipped bolts 14. The upper valve casing member 11 is rigidly secured to the front clamp member 7 by the bolts 9 and the bowl 6 is rigidly secured to the clamp by having its rim portion held between said clamp and valve casing and a nut-equipped bolt 15 which extends through aligned holes in the front member 7 and a lug on the bottom of the bowl 6. In the top of the valve casing member 11 is a water chamber 16 which is in communication with a water supply pipe, not shown, leading from a suitable source of supply. The valve 10 is arranged to close with the water pressure and has a depending stem 17 extending through and below the valve casing member 12. Formed with the valve casing member 12 is a depending nozzle 18, forward of the valve stem 17 and arranged to discharge into the bowl 6 near the bottom thereof.

For opening the valve 10 there is provided a lever-acting paddle 19 arranged to be operated by a downward pressure thereon produced by an animal while drinking from the bowl 6. Said paddle 19 is horizontally disposed, projects forward into the bowl 6 from the nozzle 18, is of annular formation and comprises two substantially duplicate sections 20 each comprising a semi-circular rim member and a cord member 21 connecting the end portions thereof. The two cord members 21 are parallel to each other and the longitudinal axis of the bowl 6 and spaced transversely of the paddle 19 to leave therein three apertures of substantially the same width.

The paddle sections 20 are hingedly connected, for opening and closing movements in the plane of the paddle 19, by overlapping the front end portions of their rim members to form hinged lugs 22 and connecting the same by a short vertical pivot 23 in the form of a rivet. The rear end portions of the rim members of the paddle sections 20 afford stops 24 which limit the closing movement of said sections.

Integrally formed with the rear end portions of the paddle sections 20 is a pair of laterally spaced rearwardly projecting fulcrum lugs 25 that are parallel to the cord members 21. These fulcrum lugs 25 have transversely aligned and vertically elongated holes 26, and between which lugs the nozzle 18 projects. Formed with the nozzle 18 on opposite sides thereof is a pair of horizontal axially aligned and outwardly projecting fulcrum studs 27 which extend through the holes 26 in the fulcrum lugs 25 and pivotally connect the paddle 19 to the nozzle 18 for vertical movement. By opening the paddle 19 into its dotted line position, as shown in Fig. 2, the fulcrum lugs 25 are released from the fulcurm studs 26 and said paddle is free for removal from the bowl 6. To apply the paddle 19 to the nozzle 18 the sections 20 thereof are opened, the lugs 25 positioned on opposite sides of the nozzle 18, with their holes 26 aligned with the studs 27 and then said sections closed to project said studs into the holes 26.

The fulcrum lugs 25 extend rearward of the nozzle 18 and have formed therewith a pair of wide, reversely formed opposing hook-acting latch members 28. These latch members 28 are yieldingly held interlocked by the hinge 22—23 and may be released to permit the paddle sections 20 to be opened, by springing said sections vertically away from each other which is permitted by the elongated holes 26 that allow the lugs 25 to move in respect to the studs 27.

The latch members 28 extend transversely under the valve stem 17 and due to the preponderance of the weight of the paddle 19, said latch members are held raised against said stem. The tension of the valve spring is such as to normally hold the valve 10 closed and the paddle 19 raised. Downward pressure on the paddle 19, sufficient to overcome the valve spring, will raise the latch members 28 which moves the valve stem 17 upward and opens the valve 10.

By reference to Fig. 1, it will be noted that the portions of the fulcrum lugs 25 having the holes 26, are upwardly extended to facilitate the movement of the latch 28 under the nozzle 18 during the application of the paddle 19 to said nozzle or the removal of the same therefrom.

To apply the paddle 19 to the nozzle 18 the sections thereof are opened and then moved rearward in the bowl 6 to carry the latch 28 under the said nozzle and align the holes 26 with the studs 27. With the paddle 19 thus positioned, the same is closed to cause the entrance of the studs 27 into holes 26 and pivotally interlock the lugs 25 with said studs.

From the above description, it is evident that the paddle 19 may be very quickly and easily removed from the bowl 6, without the use of tools, simply by springing the paddle sections 20 vertically in reverse directions from each other to release the latch 28 and open said sections to separate the fulcrum lugs 25 from the fulcrum studs 27 and release the paddle 19 from the nozzle 18 and permit the removal thereof from the bowl 6.

The members of the latch 28 are so formed as to have a cam action, the one upon the other, during the closing of the paddle sections 20 and thereby spring said sections sufficiently to permit said latch members to pass each other and then interlock by the movement of said sections to normal positions.

With the paddle 20 removed from the bowl 6, the valve 10 will remain closed and said bowl may be very easily cleaned.

What I claim is:

1. A device of the class described including a bowl, a yieldingly closed valve, and a paddle fulcrumed to the casing of the valve by separable interlocking elements and operable to open the valve, said paddle comprising two connected members that are separable to release the fulcrum elements and permit the paddle to be removed from the bowl.

2. A device of the class described including a bowl, a yieldingly closed valve, and a paddle fulcrumed to the casing of the valve by separable interlocking elements and operable to open the valve, said paddle comprising two hingedly connected members that are separable to release the fulcrum elements and permit the paddle to be removed from the bowl.

3. The structure defined in claim 2 which further includes a latch connecting the members of the paddle.

4. A device of the class described including a bowl, a yieldingly closed valve, a paddle fulcrumed to the casing of the valve by separable interlocking elements and operable to open the valve, said paddle comprising two members hingedly connected for a movement into a position to release fulcrum elements and permit the paddle to be removed from the bowl, and a latch for holding the members of the paddle closed.

5. The structure defined in claim 4 in which the latch is released by reverse movement of the members of the paddle in respect to each other transversely of their hinge movement.

6. A device of the class described including a bowl, a yieldingly closed valve having on the sides of its casing a pair of fulcrum studs, and a paddle comprising a pair of members hingedly connected for opening and closing movements in the plane thereof, said members having a pair of laterally spaced fulcrum lugs pivoted on said studs and separable therefrom by an opening movement of the paddle.

7. The structure defined in claim 6 which further includes a latch for holding the members of the paddle closed.

8. A device of the class described including a bowl, a yieldingly closed valve having on the sides of its casing a pair of fulcrum studs, and a paddle comprising a pair of members hingedly connected for opening and closing movements in the plane thereof, said members having a pair of laterally spaced fulcrum lugs provided with elongated holes into which the studs project, said lugs being separable from the studs by an opening movement of the members of the paddle, and a latch for holding the members of the paddle closed and comprising a pair of interlocking elements that are separable by reverse springing movements of the paddle members in respect to each other transversely of their hinge movement.

9. A device of the class described including a bowl, a yieldingly closed valve, the casing of which has a nozzle arranged to discharge into the bowl and also has on its sides a pair of fulcrum lugs, a horizontal paddle in the bowl forward of the valve casing and comprising a pair of members hingedly connected at their front ends for opening and closing movements in the plane thereof, a pair of rearwardly projecting fulcrum lugs one on the rear end of each member of the paddle, said lugs being laterally spaced one on each side of the valve casing and provided with elongated holes into which the fulcrum studs extend, said lugs being separable from the fulcrum studs by an opening movement of the paddle, said paddle being operable to open the valve, and a latch for holding the members of the paddle closed and comprising a pair of overlapped interlocking members on the fulcrum lugs rearward of their elongated holes and separable by reverse springing movements of the paddle members in respect to each other transversely of the plane of the paddle.

10. A device of the class described including a bowl, a yieldingly closed valve having a depending stem arranged to open the valve by an upward movement, the casing of the valve having a nozzle arranged to discharge into the bowl and also having on its sides a pair of fulcrum lugs, a horizontal paddle in the bowl forward of the valve casing and comprising a pair of members hingedly connected at their front ends for opening and closing movements in the plane thereof, a pair of rearwardly projecting fulcrum lugs one on the rear end of each member of the paddle, said lugs being laterally spaced one on each side of the valve casing and provided with elongated holes into which the fulcrum studs extend, said lugs being separable from the fulcrum studs by an opening movement of the paddle members, and a latch for holding the members of the paddle closed and comprising a pair of overlapped interlocking members on the fulcrum lugs rearward of their elongated holes and separable by reverse springing movements of the paddle members in respect to each other transversely of the plane thereof, said latch being under the valve stem and held there against by the paddle and operable by a downward movement of the paddle to lift the valve stem and open the valve.

In testimony whereof I affix my signature.

CASPER F. HANSON.